(12) United States Patent  (10) Patent No.: US 7,593,573 B2
Hahn et al.  (45) Date of Patent: Sep. 22, 2009

(54) METHOD AND DEVICE FOR VISUALIZING THE SURROUNDINGS OF A VEHICLE

(75) Inventors: Wolfgang Hahn, Schwabhausen (DE); Thomas Weidner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 381 days.

(21) Appl. No.: 11/404,079

(22) Filed: Apr. 14, 2006

(65) Prior Publication Data

US 2006/0257024 A1  Nov. 16, 2006

Related U.S. Application Data

(63) Continuation of application No. PCT/EP2004/010809, filed on Sep. 24, 2004.

(30) Foreign Application Priority Data

Oct. 16, 2003  (DE)  ................. 103 48 109

(51) Int. Cl.
  *G06K 9/00*  (2006.01)
  *B60Q 1/00*  (2006.01)
(52) U.S. Cl. ............. 382/181; 382/103; 382/104; 382/118; 382/115; 382/203; 250/332; 348/164; 348/168; 348/169; 340/435
(58) Field of Classification Search ............. 382/181, 382/104, 115, 190, 118, 103; 348/164; 345/619; 250/330, 338.7, 332; 13/181, 104, 115
See application file for complete search history.

(56) References Cited

U.S. PATENT DOCUMENTS 4,967,276 A * 10/1990 Murakami et al. .......... 348/164
5,001,558 A * 3/1991 Burley et al. ................ 348/164

(Continued)

FOREIGN PATENT DOCUMENTS

DE  695 06 174 T2  4/1999

(Continued)

OTHER PUBLICATIONS

Amditis A. et al., "Multiple—Sensor—Collision avoidance system for automotive applications using an IMM approach for obstacle tracking", Proceedings of the Fifth International Conference on Information Fusion, Fusion 2002, Int. Soc. Inf. Fusion Sunnyville, Ca., USA vol. 2 (2002), pp. 812-817.

(Continued)

*Primary Examiner*—Vikkram Bali
*Assistant Examiner*—Nancy Bitar
(74) *Attorney, Agent, or Firm*—Crowell & Moring LLP

(57) ABSTRACT

A method and device for visualizing the surroundings of a vehicle, in particular for detecting and representing the traffic situation in front of a driver are provided. A night vision information system fuses video images from essentially the same location and time but from different spectral regions are fused using weighting factors. The video images are weighted with a globally settable preliminary weighting factor, and an object analysis of the video images is performed. Based on the object analysis the weighting factors are locally adapted in an object-selective manner.

11 Claims, 1 Drawing Sheet

U.S. PATENT DOCUMENTS

Figure 1:
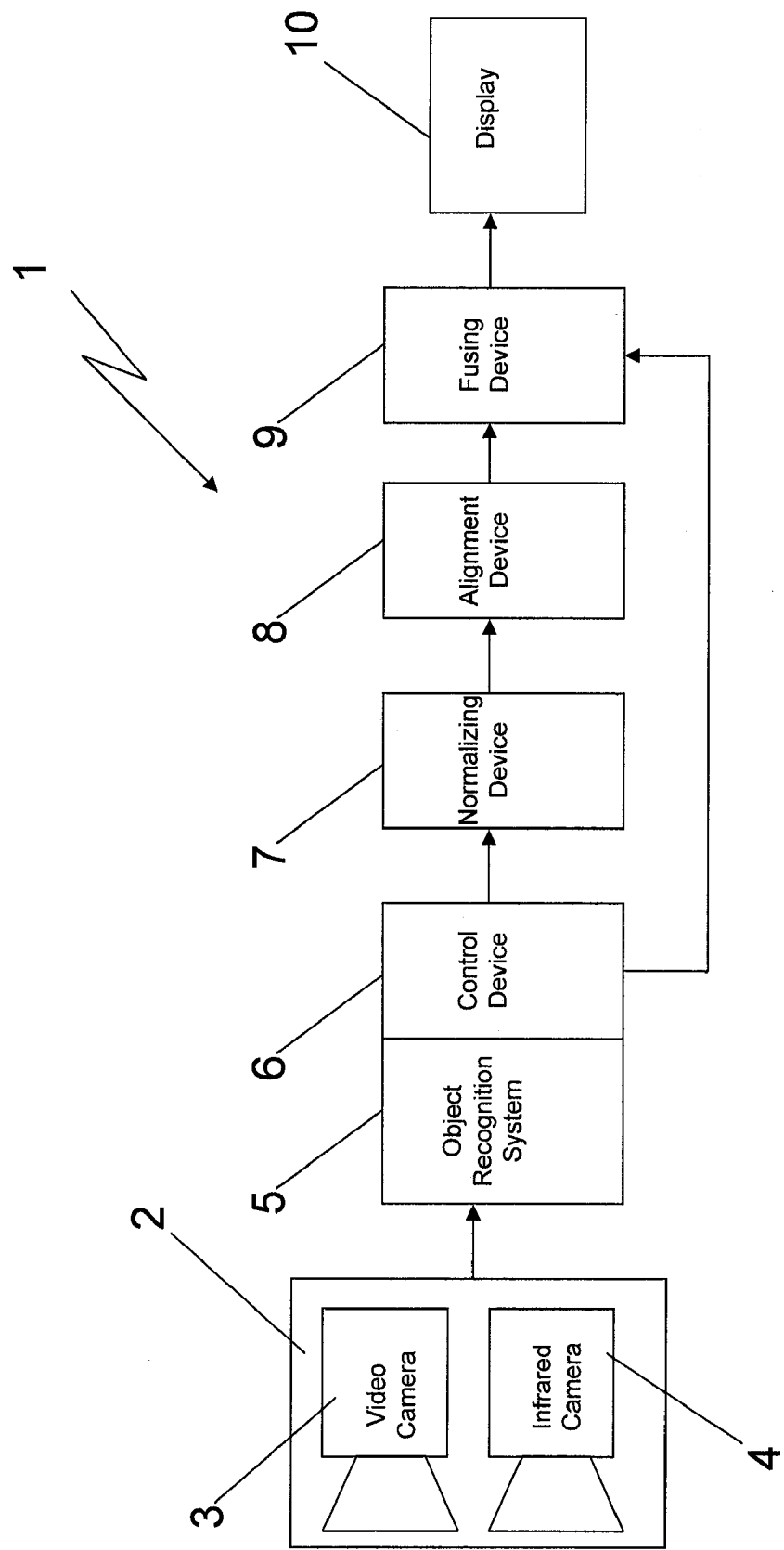

| | | | |
|---|---|---|---|
| 6,061,068 A * | 5/2000 | Hoffman et al. | 345/619 |
| 6,150,930 A * | 11/2000 | Cooper | 340/435 |
| 6,961,466 B2 * | 11/2005 | Imagawa et al. | 382/190 |
| 7,027,619 B2 * | 4/2006 | Pavlidis et al. | 382/115 |
| 7,139,411 B2 * | 11/2006 | Fujimura et al. | 382/103 |
| 7,199,366 B2 * | 4/2007 | Hahn et al. | 250/330 |
| 7,358,496 B2 * | 4/2008 | Fleury et al. | 250/332 |
| 7,425,076 B2 * | 9/2008 | Schofield et al. | 359/604 |
| 2002/0136434 A1 * | 9/2002 | Kuroda et al. | 382/118 |

FOREIGN PATENT DOCUMENTS

| | | |
|---|---|---|
| DE | 199 11 648 A1 | 9/2000 |
| DE | 101 24 005 A1 | 12/2002 |
| DE | 102 28 638 A1 | 1/2003 |
| DE | EP1339228 * | 8/2003 |
| DE | 102 07 039 A1 | 9/2003 |

OTHER PUBLICATIONS

International Search Report dated Dec. 17, 2004 (Six pages, including English translation of pertinent portion).

German Search Report dated Aug. 5, 2004 (Four pages, including English translation of pertinent portion).

* cited by examiner

METHOD AND DEVICE FOR VISUALIZING THE SURROUNDINGS OF A VEHICLE

CROSS REFERENCE TO RELATED APPLICATIONS

This application is a continuation under 35 U.S.C. § 120 to International Patent Application No. PCT/EP2004/010809 filed Sep. 24, 2004, and under 35 U.S.C. § 119 to German Patent Application No. 103 48 109.5 filed Oct. 16, 2003, the entire disclosure of the aforementioned are herein expressly incorporated by reference.

BACKGROUND AND SUMMARY OF THE INVENTION

The invention relates to a method for visualizing the surroundings of a vehicle, in particular for detecting and representing the traffic situation in front of a driver, using a night vision information system wherein video images from essentially the same location and time but from different spectral regions are fused, and in the fusion of the video images the different spectral regions are provided with weighting factors.

The invention further relates to a device for visualizing the surroundings of a vehicle, in particular for detecting and representing the traffic situation in front of a driver, using a night vision information system wherein video images from different spectral regions can be recorded essentially at the same location and time by a camera system, and the video images may be fused in a weighted manner by use of a fusion device.

Night vision information systems are known for assisting the visibility of the driver of a vehicle at night or in adverse weather conditions, such as rain, fog, or snow flurries. These systems record video images of a traffic situation in front of the driver and present these to the driver on a display. Night vision information systems usually operate with an infrared (IR) camera which detects a thermal image of a portion of the surroundings. Under unfavorable visibility conditions, the driver is thereby provided with an aid in the early recognition of heat-radiating objects which are unlighted and therefore not directly perceivable by the driver, in particular pedestrians, bicyclists, or animals, thereby avoiding accidents.

German Patent Document No. DE 102 07 039 A1 discloses a method and device for visualizing the surroundings of a vehicle wherein, in addition to the IR camera for the infrared spectral region, a VIS camera for the visible (visual) spectral region is used in a night vision information system. In each case, in a fusion device a digitized IR image and a VIS image from essentially the same location and time are superimposed by software to within pixel accuracy. In this manner, individual pixel pairs or entire pixel regions are processed by a weighted averaging of the pixel information. In the averaging, the IR information and the VIS information may be weighted differently, in particular as a function of the brightness of the surroundings, the color in the visual image, or an information domain, derivable according to information theory, in the particular spectral region. The weighting may be performed either over the entire surface or in individual image regions. As a result of the superimposition of the IR image on the VIS image, the driver is able to associate the traffic situation in front of him, which is detected visually through the windshield, with the corresponding traffic situation, which is represented by the night vision information system via the video image, more easily than with night vision information systems that operate using only IR images.

A disadvantage of the known method is that the contrast in the fused images is set relatively uniformly over the image screen. Although the adjustable weighting of the IR image and the VIS image in the averaging of the fused image improves the overall contrast compared to unweighted images, various details within an image region are not treated equally. As a result, important details shown on the video screen in certain traffic situations, such as persons on the roadway, for example, may not be sufficiently distinguished from the surroundings.

The object of the present invention, therefore, is to improve the known method for visualizing the surroundings of a vehicle by use of a night vision information system in such a way that the ability to perceive individual image objects is increased.

The object is achieved by the fact that first the video images are weighted with a globally settable preliminary weighting factor, second an object analysis of the video images is performed by means of an object recognition system and third the weighting factors are locally adapted in an object-selective manner based on the object analysis.

The object-selective adaptation of the weighting factors allows detected objects in the surroundings of the vehicle to be represented with optimum contrast for better recognition by the driver, since the spectral portions which make the largest contribution to perception of the objects are more heavily weighted. To this end, first a preliminary surface-wide (global) weighting of the spectral portions for the image fusion, for example, one-half intensity each for the VIS spectral region and for the IR spectral region, is set. Image fusion is basically understood to mean the formation of new pixels from a weighted averaging of the intensity of associated pixel pairs, as well as the superimposition with a weighted addition of the intensities. The local adaptation of the weighting factors and their final definition is then performed, based on the objects detected or recognized by the object recognition system.

Suitable object recognition systems are available in principle. Their mode of operation is known, for example, from German Patent Document No. DE 199 55 919 C1 and the cross-references contained therein. In general, object recognition systems are based on an automatic object analysis of digital images or on pattern recognition, and deliver a prediction of the presence of certain specified objects. The object recognition system according to the invention performs an image analysis in every recorded spectral region. Based on the recognition and differentiation of detected objects such as persons, animals, or obstacles, the spectral weighting factors may then be modified in a targeted manner in the particular image regions, depending on their radiation intensity in the visible and the infrared regions. The weighting factors may be set in such a way that the detected objects in each case are represented primarily in the spectral region in which they are most clearly perceived on the fused video image by the driver. In this manner, in particular persons and animals, which have no visual portions at great distances but which are detectable very well in the infrared region, are classified even better in the vehicle's own surroundings by this adaptation, since there is no reduction in contrast caused by the fusion with the dark background. Accordingly, objects having a significantly better signature in the visible region, such as roadway markers due to the affixed reflectors, are provided with a heavier weighting in the visible region.

According to one embodiment of the invention, by use of the object recognition system an object evaluation is performed for the detected objects according to their relevance, and the local weighting factors are adapted to the associated relevance of the particular object based on the object evaluation, so that specified detected objects in each case are represented primarily in the spectral region in which they can be most clearly perceived on the fused video image by the driver.

By means of the object evaluation, local weighting factors may be reinforced or attenuated in a targeted manner. In particular, by an overweighting of a specific spectral portion it is thus possible to make the driver explicitly aware of especially relevant, in particular dangerous and/or endangered objects. In this manner, increased safety may be realized for the driver and other traffic participants in darkness and with poor visibility. The overweighting may be achieved, for example, by a local enhancement in the image region of interest, or by a reduction of a spectral portion in the object surroundings.

Particularly suitable for the object evaluation are object recognition systems that operate with an object classification system. By use of various object classes, for example persons, animals, vehicles, obstacles, etc., the relevance of the detected objects may be classified in a particularly rapid and dependable manner.

According to a further preferred embodiment of the invention, image regions in which no relevant objects are detected or whose relevance cannot be unambiguously assigned are weighted using the globally set weighting factor.

The setting of the global weighting factors in image regions without relevant objects or without an unambiguous assignment ensures that the information from these image regions as well is displayed to the driver.

According to a further preferred embodiment of the invention, a continuous transition between adjacent relevant and irrelevant image regions is produced in the fused video image by means of a variable characteristic curve of the ratio of the weighting factors for different spectral regions.

As a result of the continuous transition between image regions and their surroundings which are particularly emphasized due to their relevance, the unnoticeable, smooth progression produces a harmonious and realistic visual impression in the respective fused video image.

According to a further preferred embodiment of the invention, in the fusion of the video images, radiation portions having wavelengths from the visible spectral region and radiation portions having wavelengths from the infrared spectral region are taken into account.

The detection of the visible spectral region (approximately 380 nm-780 nm) records all objects which shine or are illuminated for the human eye. In the infrared region (approximately 780 nm-1 mm), all objects which emit thermal radiation are detected. In this manner, informational content which comprehensively reflects the instantaneous traffic situation is obtained in the fused images. In particular for persons that are detected without illumination and therefore do not reflect visible radiation, a heavier weighting in the FIR spectral region (approximately 25 μm-1 mm) is particularly effective.

According to a further preferred embodiment, color information is processed in the visual video images.

The color information may further enhance the ability to perceive certain objects in the fused images. The effect of the object-selective weighting is thereby supported. The driver may be made aware of, for example, red brake lights, traffic lights, or signal devices in a more noticeable manner, so that the instantaneous traffic situation is recognized more quickly and the risk of accidents is further reduced.

According to a further preferred embodiment of the invention, masking and/or occlusion effects from detected objects are at least partially suppressed by means of the adaptation of the local weighting factors.

Possible masking or occlusion effects may be controlled by use of the local weighting factors. The masking may be suppressed significantly by a targeted modification of the weighting factors in the masked regions. The ability to interpret the represented images is also thereby improved.

The device, disclosed in German Patent Document No. DE 102 07 039 A1, for visualizing the surroundings of a vehicle has the disadvantage that in various spectral regions it detects the image, but not the content, of the traffic situation in front of the driver. As a result, relevant objects may be displayed to the driver in a relatively inconspicuous manner.

A further object of the present invention, therefore, is to improve the known device for visualizing the surroundings of a vehicle in such a way that relevant image objects may be more noticeably displayed.

The object is achieved according to the invention by the fact that upstream from the fusion device an object recognition system is situated by which objects located in the surroundings of a vehicle are detectable by means of the camera system, and a control device is provided by which, in operative connection with the object recognition system, the fusion device may be actuated with an object-selective local spectral region weighting.

By means of the operative connection of the night vision information system, which via the camera system combines image information from at least two different spectral regions, to the object recognition system, the driver may be made especially aware of particularly important, i.e., relevant, objects such as persons, since these objects can be particularly emphasized in the fused video images as a result of the object-selective spectral region weighting. The overall contrast in the fused video images is enhanced, since in principle all detected objects can be represented in the spectral region in which they leave the best signature, i.e., in which they appear most noticeably.

According to one preferred embodiment of the invention, the camera system has at least one sensor that is sensitive in the visible spectral region, and at least one sensor that is sensitive in the infrared spectral region.

By virtue of the fact that the camera system is able to detect objects in the visible and infrared regions, visible objects as well as strictly heat radiators may be represented in the fused video images. In this manner a very high quality of perception and a simple association of the display of the night vision information system with the traffic situation in front of the driver are achieved.

According to a further preferred embodiment of the invention, a heads-up display is provided on which the fused video images may be presented to the driver.

The heads-up display enables the fused video images to be projected in particular on a lower portion of the windshield of a vehicle. The images therefore appear in the driver's immediate line of vision without impairing the driver's straight-ahead vision, thereby achieving a particularly high attention level for the driver and enabling a quick reaction during a perceived danger. Of course, in principle it is also possible to represent the video images on a conventional monitor, for example an LCD display.

Further particulars of the invention result from the following detailed description and the accompanying drawing, which illustrates one preferred embodiment of the invention as an example.

Other objects, advantages and novel features of the present invention will become apparent from the following detailed description of the invention when considered in conjunction with the accompanying drawings.

BRIEF DESCRIPTION OF THE DRAWING FIGURES

FIG. 1 illustrates a block diagram of a device for visualizing the surroundings of a vehicle in accordance with exemplary embodiments of the present invention.

DETAILED DESCRIPTION OF THE PREFERRED EMBODIMENTS

A device for visualizing the surroundings of a vehicle essentially comprises a night vision information system 1, installed in a vehicle, having an object recognition system 5.

The design of the night vision information system 1 illustrated in FIG. 1 as a block diagram corresponds in principle to the system disclosed by German Patent Document No. DE 102 07 039 A1.

A video camera 3 for recording video images in the visible spectral region and an infrared camera 4 for recording video images in the infrared spectral region are provided in a camera system 2. The cameras are advantageously designed as digital cameras having sensors that are sensitive in the corresponding spectral regions. According to the invention, the object recognition system 5 is provided downstream from the camera system 2, i.e., upstream from a fusion device 9. Associated with the object recognition system 5 is a control device 6 by which the fusion device 9 may be actuated. Situated in between is a normalizing device 7 in which imaging errors in the video images may be eliminated by software in a manner known in principle. An alignment device 8 is also provided in which the VIS images and IR images recorded at the same location and time may be aligned with one another by use of a digital image processor, so that the respective matching image pairs are superimposed within pixel accuracy. The fusion device 9 for weighted fusion of the superimposed VIS images and IR images is situated downstream from the alignment device 8. The fused images may be displayed on a head-up display 10.

A method for visualizing the surroundings of a vehicle is based essentially on a weighted fusion of video images, from the same location and time but from different spectral regions, of a traffic situation in front of the driver.

The method is described below with reference to the device illustrated in FIG. 1.

A recording of driving surroundings in front of the driver is made at approximately the same location and time by use of the camera system 2 having the camera 3 sensitive to visible radiation and the camera 4 sensitive to infrared radiation. The resulting VIS digital imaging and the IR digital imaging of the surroundings of the vehicle are subjected to an automatic image analysis in the object recognition system. The detected, i.e., recognized, objects are evaluated according to their relevance in an object classification system. For example, persons receive the highest relevance class. The video images are then corrected in the normalizing device 7 for imaging errors, for example distortions, that are present, and are then superimposed to within pixel accuracy in the alignment device 8. The superimposed video images are then digitally processed in the fusion device 9.

In this digital image processing, a fused pixel is generated from each matching pixel pair. In this manner the IR portion and the VIS portion are multiplied with weighting factors. First a weighting is set over the entire surface (globally) which, for example, is a function of the brightness of the surroundings (daylight/twilight/darkness). The local weighting factors are then determined in the object recognition system 5, based on an object analysis. The detected objects receive a heavier weighting in the spectral region in which they radiate more intensely. In addition, particularly relevant objects receive a heavier weighting than less relevant objects.

The fusion device 6 is then actuated by the control device 9 in such a way that the local image regions that contain the detected objects are weighted according to the local weighting factors, i.e., the objects are essentially represented in the spectral region in which they leave the best signature. For example, unlighted persons are represented primarily in the infrared region, whereas reflective roadway markers are represented primarily in the visible region. Furthermore, fine tuning may be performed to achieve smooth transitions between relevant and irrelevant image regions, and to suppress masking effects. As a result, a strongly contrasted fused video image is produced on which the relevant objects appear particularly emphasized.

The visual images preferably are recorded with a color VIS camera to generate a fused color video image. The images thus appear more realistic, and the driver is able to recognize the various detected objects more precisely and associate them more easily with the vehicular surroundings in front of him.

The fused images are continuously projected on the head-up display 10 corresponding to the recording frequency of the camera system 2 and the processing speed in the downstream devices 5 through 9, so that the objects present in the surroundings of the vehicle are immediately displayed to the driver, and are perceived with high reliability by the driver even in darkness and with poor visibility.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for visualizing the surroundings of a vehicle by a night vision information system, the method comprising the acts of:
   detecting video images, of different spectral regions, from essentially the same location and time;
   weighting the video images with a globally settable preliminary weighting factor;
   performing object analysis, using an object recognition system, of the video images;
   locally adapting the weighting factors based on the object analysis in an object-selective manner to generate locally adapted weighting factors; and
   fusing the video images based, at least in part, on the locally adapted weighting factors.

2. The method according to claim 1, wherein using the object recognition system includes performing an object evaluation for the detected objects according to their relevance, and the local weighting factors are adapted to the associated relevance of the particular object based on the object evaluation, so that specified detected objects are represented primarily in the spectral region in which they can be most clearly perceived on the fused video image by a driver of the vehicle.

3. The method according to claim 2, further comprising the act of:
   dividing the detected objects for the object evaluation into object classes.

4. The method according to claim 1, wherein image regions in which no relevant objects are detected or whose relevance cannot be unambiguously assigned are weighted using the globally set weighting factor.

5. The method according to claim 1, wherein a continuous transition between adjacent relevant and irrelevant image regions is produced in the fused video image using a variable characteristic curve of the ratio of the weighting factors for different spectral regions.

6. The method according to claim 1, wherein fusing of the video images includes accounting for radiation portions having wavelengths from the visible spectral region and radiation portions having wavelengths from the infrared spectral region are taken into account.

7. The method according to claim 1, wherein color information is processed in the visual video images.

8. The method according to claim 1, further comprising suppressing, at least partially, masking and/or occlusion effects from detected objects by the adaptation of the local weighting factors.

9. A device for visualizing the surroundings of a vehicle, the device comprising:
   a camera system that records video images from different spectral regions essentially at the same location and time;
   a fusion device that fuses the video images in a weighted manner, wherein the fusion device globally applies a preliminary weighting factor to the video images;
   an object recognition system, located upstream from the fusion device, which locates objects in the surroundings of a vehicle using images provided by the camera system; and
   a control device which in operative connection with the object recognition system actuates the fusion device with an object-selective local spectral region weighting, wherein the fusion device locally adapts weighting factors based on a result of the object recognition system in an object-selective manner.

10. The device according to claim 9, wherein the camera system has at least one sensor that is sensitive in the visible spectral region, and at least one sensor that is sensitive in the infrared spectral region.

11. The device according to claim 9, further comprising:
   a heads-up display on which the fused video images are presented to the driver.

* * * * *